3,463,686
CATHODOLUMINESCENT SCREENS AND
FABRICATION THEREOF
Anthony V. Gallaro, Auburn, N.Y., and William R. McKeirnan, Crosby, Pa., assignors to Sylvania Electric Products Inc., a corporation of Delaware
Filed Sept. 8, 1965, Ser. No. 485,714
Int. Cl. B32b 5/16, 17/06
U.S. Cl. 156—67                                        9 Claims

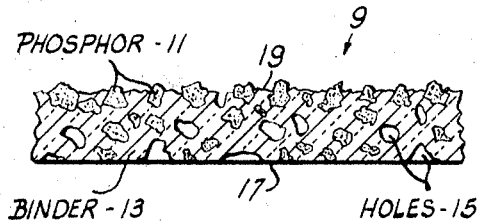
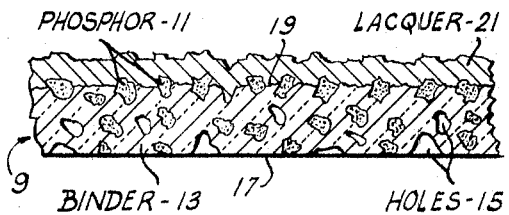
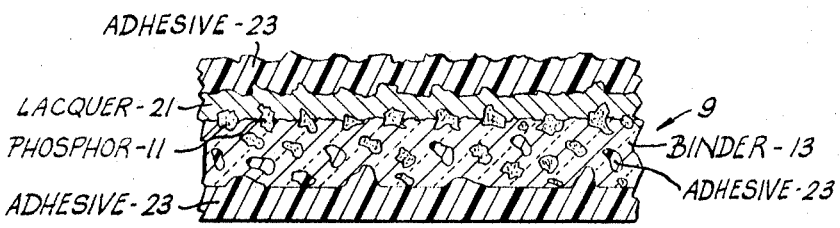
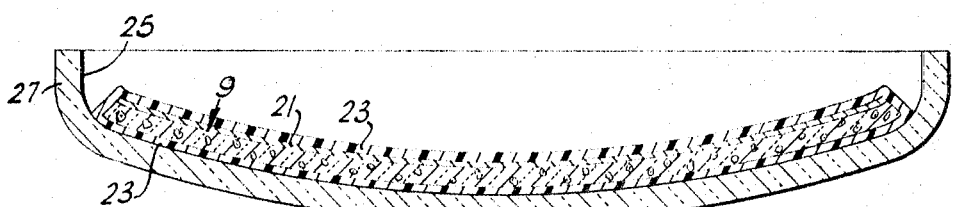
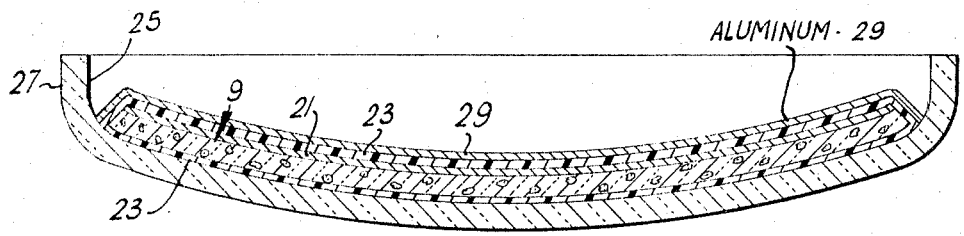
INVENTORS
ANTHONY V. GALLARO &
WILLIAM R. MCKEIRNAN INVENTORS
ANTHONY V. GALLARO &
WILLIAM R. McKEIRNAN
ATTORNEY United States Patent Office 3,463,686
Patented Aug. 26, 1969

ABSTRACT OF THE DISCLOSURE

A cathodoluminescent screen fabricating process includes the steps of casting a pliable self-supporting film of phosphor particles homogeneously dispersed in an organic binder, wetting the film with an organic adhesive, contacting the film and the inner surface of the faceplate of a cathode ray tube, and heating to volatilize the organic materials and affix the phosphor particles to the faceplate.

---

This invention relates to cathodoluminescent screens for cathode ray tubes and to an improved process for fabricating such screens.

Of the numerous problems associated with the manufacture of cathode ray tubes, which includes picture tubes for both monochrome and color television receivers, the cathodoluminescent screen and its fabrication stand out as the most challenging because of the relatively large proportion of expense involved in providing the screen and the potential possibilities of enhancing the performance of the cathode ray tube by improvements in the screen. Obviously, a cathodoluminescent screen providing an improved performance and fabricated by a process which is consistent, efficient, and has a favorable cost factor in comparison with present known methods is highly desirable.

Referring to improved performance, two of the many criteria for evaluating performance of a cathode ray tube are line resolution and noise. Line resolution may be defined as the distinguishable width of a single scan line traversing the viewing surface of a cathode ray tube. Thus, the resolution of a particular tube structure increases as the width of a scan line decreases and high line resolution inherently requires a uniform and relatively thin screen in order to prevent optical scattering.

Noise may be defined as a distinguishable variation in brightness between two points on a single scan line at a given beam current value. Inherently, a low noise factor necessitates a screen having a uniformly dense packing of phosphor particles. Thus, a cathodoluminescent screen which provides both high line resolution and a low noise level must be relatively thin, of uniform thickness, and of uniform phosphor density or particle packing.

The techniques suggested by the prior art for fabricating cathodoluminescent screens include spraying, settling, slurrying, dusting, and printing. However, in the areas of cost, improved line resolution, and reduced noise and more specifically, in the areas of uniformity of density and thickness in a relatively thin cathodoluminescent screen, each of these processes leaves much to be desired.

Referring to spraying techniques, a spray technique inherently requires a low viscosity suspension and it is well known that difficulty is encountered in maintaining a homogeneous dispersion of particles in such suspension. Also, layers provided by a spray technique are usually porous and coarse which is highly undesirable in a cathodoluminescent screen for a cathode ray tube. Settling processes are usually dependent upon gravity flow of particles through a water cushion. Since heavier particles tend to "settle out" while lighter and smaller particles remain suspended, the resultant screen is not only of non-uniform thickness but non-uniform density as well. Also, smaller particles, which have a relatively large surface area, tend to deposit during the decanting of the water cushion to provide "furrows" or waves perpendicular to the direction of decanting.

A slurry process combines a low viscosity suspension and decanting process with rotational movement of the cathode ray tube faceplate. As mentioned above, such suspensions and processes tend to provide both non-uniformity of thickness and non-uniformity of density in the deposited layer because of particle settling and uneven particle deposition during the decanting process. Dusting processes are also dependent upon gravitational flow wherein the heavier particles "settle out" and provide non-uniformity of thickness and density. Printing techniques are confined to a flat surface which is inconsistent with the curved faceplate of most cathode ray tubes and to backing layers which tend to space the phosphor particles from the faceplate and require removal. Further, printing techniques, such as "silk screening," inherently require a webbed structure during deposition which tends to produce undesired voids and non-uniformity of the resultant phosphor layer.

Therefore, it is an object of this invention to enhance the uniformity of thickness and density of a cathodoluminescent screen in a cathode ray tube.

Another object of the invention is to provide a uniformly thick and uniformly dense cathodoluminescent screen in a cathode ray tube by an improved process.

Still another object of the invention is to enhance the line resolution and reduce the noise in a cathode ray tube by providing an improved process for depositing a cathodoluminescent screen.

A further object of the invention is to provide an improved process for fabricating a cathodoluminescent screen for a cathode ray tube utilizing a pliable self-supporting film.

A still further object of the invention is to provide an improved process for fabricating a cathodoluminescent screen wherein an electron permeable opaque metal layer is directly applied to a pliable self-supporting film containing phosphor particles.

These and other objects are achieved in one aspect of the invention by a cathodoluminescent screen which includes a relatively thin phosphor particle layer of substantially uniform thickness and density. The film is fabricated in accordance with a process wherein a viscous suspension is cast to provide a pliable self-supporting film which includes phosphor particles homogeneously dispersed in a volatile organic binder. The film is uniformly wetted with a volatile adhesive solution, affixed to the inner surface of a cathode ray tube faceplate, and heated to remove the volatile organic constituents therefrom and affix the phosphor particles to the inner surface of the cathode ray tube faceplate.

For a better understanding of the present invention, together with other and further objects, advantages, and capabilities thereof, reference is made to the following disclosure and appended claims in connection with the accompanying drawings in which:

FIG. 1 is a cross-sectional view of a pliable self-supporting film having phosphor particles homogeneously dispersed in a binder;

FIG. 2 is a cross-sectional view of the film of FIG. 1 showing a lacquer layer affixed to the film;

FIG. 3 is a cross-sectional view of the film and affixed lacquer layer of FIG. 2 and illustrates the attachment thereto of an adhesive layer;

FIG. 4 illustrates the location and attachment to the inner surface of a cathode ray tube faceplate of the embodiment of FIG. 3;

FIG. 5 shows the application of an electron permeable layer to the structure of FIG. 4;

Figure 6:
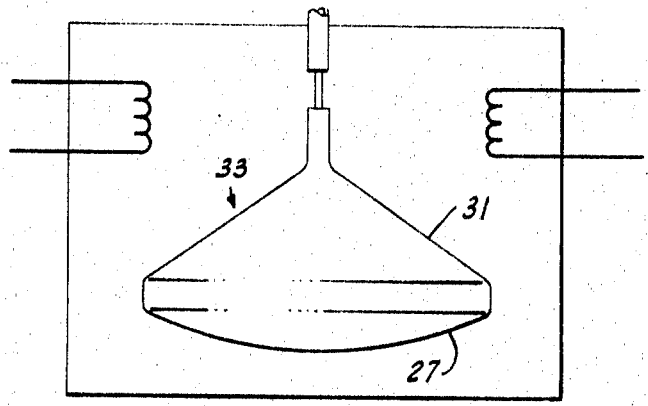
FIG. 6 illustrates an assembled cathode ray tube including the structure of FIG. 5 and in condition for normal processing.

Referring to the process for fabricating a cathodoluminescent screen, a viscous suspension containing phosphor particles, a volatile organic binder, and suitable solvents is prepared in a manner similar to the teaching of U.S. Patent No. 3,017,281 issued to Lambert and McKiernan and assigned to the assignee of the present application. This suspension is cast in accordance with the techniques set forth in U.S. Patent No. 2,974,364 issued to the above-mentioned Lambert and McKiernan to provide a pliable self-supporting film 9 illustrated in FIG. 1.

The film 9 includes the phosphor particles 11 homogeneously dispersed in a volatile organic binder 13 and a plurality of voids or holes 15. The suspension has a viscosity such that the phosphor particles are homogeneously dispersed regardless of their relative size. In other words, the phosphor particle dispersion in the film 9 is uniform for particles as fine as 0.5 micron and as coarse as 40 microns as well as mixtures thereof. Also, the viscosity of the suspension virtually eliminates the problem of non-uniformity of particle dispersion due to gravitational settlement and in combination with the casting process is conducive to the formation of a uniform thickness of the film 9.

The film 9 has a relatively smooth surface 17 because of the smoothness of the surface whereon it is cast and a relatively rough surface 19 due to the evaporation of the solvents therefrom. The film 9 is castable in a wide range of thickness and it has been found that a thickness in the range of about 0.0006 to 0.001 inch is suitable for the formation of cathodoluminescent screens exhibiting a relatively high line resolution and low noise level. When the film 9 has a thickness less than about 0.0006 inch, it has been found that the self-supporting features are deleteriously affected and special equipment and care are required for handling and transportation.

Further, the film 9 may be cast in various forms to provide a variety of cathodoluminescent screens dependent upon the ultimate type of cathode ray or picture tube desired. For example, repetitive groupings of three contiguous casting vessels may have therein suspensions containing phosphor particles representative of the colors, red, green, and blue respectively when activated by an electron beam. These suspensions are then cast to provide a pliable self-supporting film 9 having a thickness in the range of about .0008 to 0.002 inch with substantially parallel groupings of red, green, and blue strips respectively from which may be provided a cathodoluminescent screen suitable for the fabrication of a color picture tube. Alternately, the film 9 may include very fine phosphor particles, in the range of about 0.5 to 3 microns, which are uniformly packed to provide high line resolution low noise level cathode ray tubes. Further, the film 9 may be cast in the form of multiple attached layers to provide a laminated film stack suitable for use in multilayered cathodoluminescent screens dependent upon depth penetration of electron beams for activation of the various layers. Obviously, numerous variations are applicable and appropriate.

Additionally, FIG. 2 illustrates the film 9 of FIG. 1 with a lacquer layer 21 affixed to the relatively rough surface 19 thereof. As is well known in the present-day manufacture of cathodoluminescent screens, it is a common practice to provide an electron permeable reflective layer in order to enhance the brightness characteristic. However, care must be exercised to prevent the materials of the reflective layer from penetrating the phosphor particles 11 and deleteriously affecting the light emissive capabilities thereof.

Preferably but not necessarily, the lacquer layer 21 is affixed to the film 9 by a casting process coincident with the casting of the film 9. More specifically, the film 9 is cast in a manner previously described and the solvents allowed to evaporate therefrom to provide the relatively rough surface 19. Thereupon, the lacquer layer 21 is cast onto the relatively rough surface 19 at a substantially continuous and constant rate and at a substantially uniform thickness.

The lacquer of the layer 21 may consist of any one of a number of well known and commercialy available materials as for example nitrocellulose or resin materials dissolved in suitable solvents. Further, the viscosity of the lacquer may be altered to provide a layer 21 having physical characteristics complimentary to the type of cathodoluminescent screen desired. For example, a relatively low viscosity type lacquer may be utilized to provide a layer 21 which substantially follows the relatively rough contour of the surface 19 of the film 9 and provides a substantially rough surface whereon and electron permeable metal layer may be deposited. Obviously, such a surface would be applicable to cathode ray tubes wherein high line resolution is desired with a minimum of reflection and optical scattering or color picture tubes wherein reflection is deleterious to a true color rendition.

On the other hand, a lacquer having a relatively high viscosity may be cast to provide a layer 21 of substantially uniform thickness spanning the peaks of the phosphor particles 11 at the relatively rough surface 19 of the film. Such a lacquer layer 21 would provide a relatively smooth surface for deposition thereon of a relatively smooth and highly reflective layer of electron permeable material suitable for enhancing the brightness of a monochrome picture tube for example.

Having provided a pliable, self-supporting film 9 which is readily transportable and includes phosphor particles 11 homogeneously dispersed in a volatile organic binder 13 and holes 15 as well as an affixed lacquer layer 21, the film 9 and lacquer layer 21 are thoroughly wetted with a volatile organic adhesive solution 23 or illustrated in FIG. 3. For example, a 2% solution of polyvinyl alcohol is a preferred adhesive solution 23 although other percentages and other binders such as hydrolyzed ethyl silicate and potassium silicate are applicable and appropriate.

As to the wetting of the film 9, it has been found that the film 9 tends to absorb the adhesive solution in an uneven amount and at an uneven rate due to the holes 15 therein. Thus, the preferred technique is to soak or immerse the film 9 in the adhesive solution 23 to cause a thorough and uniform wetting thereof. Obviously, other wetting techniques are appropriate so long as a thoroughly and uniformly wetted film 9 is obtained.

The film 9 having an affixed lacquer layer 21 and thoroughly wetted with the adhesive solution 23 is then placed in contact with the inner surface 25 of the faceplate 27 of a cathode ray tube as illustrated in FIG. 4. Since the inner surface 25 of the faceplate 27 is relatively smooth, the relatively smooth surface 17 of the film 9 is placed in contact therewith to provide a maximum area of contact as well as maximum adherence therebetween. The tenacious adherence between the film 9 and inner surface 25 of the faceplate 27 is insured by any one of a number of techniques. A preferred technique is to blot the film 9 with a filter paper to remove any excess adhesive solution 23 and to roll the film 9 with an ordinary photographer's print roller to eliminate any bubbles or loosely affixed sections.

Referring to the structure illustrated in FIG. 5, the adhesive solution 23 adheres the relatively smooth surface 17 of the film 9 to the relatively smooth inner surface 25 of the faceplate 27. Also, the adhesive solution 23 adhered to the lacquer layer 21 affixed to the relatively rough surface 19 of the film 9 is utilized to adhere a layer 29 of electron permeable material such as aluminum which may be deposited thereon by any one of a number of techniques well known in the art.

Figure 7:
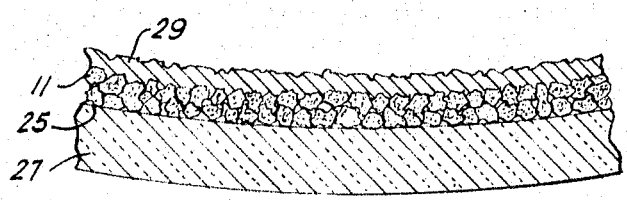
FIG. 7 is a cross-sectional view of a cathodoluminescent screen fabricated from the structure of FIG. 5.

Thereafter, the faceplate 27 is attached to a cone 31 having the usual electron gun components therein to provide a cathode ray or picture tube 33 as illustrated in FIG. 6. The tube 33 is heated and exhausted during a normal cathode ray tube heating and exhaust cycle whereupon the organic constituents are volatilized from the film 9, lacquer layer 21, and adhesive solution 23, and the phosphor particles 11 are affixed to the inner surface 25 of the faceplate 27. Also, the layer 29 of electron permeable material is affixed to the phosphor particles 11 as illustrated in FIG. 7.

It should be noted that the deposition of the electron permeable material layer 29 onto the lacquer layer 21 is also appropriate after the cone 31 and faceplate 27 have been attached and prior to the above-mentioned heating and exhaust cycle. Further, it has been found that a film which has been thoroughly and uniformly wetted with an adhesive solution and firmly adhered to the inner surface of the faceplate, does not require a lacquer layer to prevent penetration of the film by the electron permeable metal layer 29. It is believed that this failure of the metal to penetrate the film is due to the filling of the holes 15 of the film with adhesive solution and the tenacious adherence and intimate contact of the relatively thin layer of phosphor particles and the relatively smooth inner surface of the faceplate.

Thus, there has been provided a unique cathodoluminescent screen and a process for fabricating cathodoluminescent screens for cathode ray tubes which have numerous advantages over the known screens and screen fabricating processes. For example, the screen is of a thickness and has a uniformity of thickness especially applicable to the provision of relatively high line resolution cathode ray tube. Also, the phosphor particles of the screen are uniformly distributed and uniformly packed regardless of variations in particle size, surface area, and bulk density and such uniformity of thickness, particle distribution and packing is believed to be unavailable in any other known cathodoluminescent screen. Further, the highly desirable line resolution and noise level of cathode ray tubes having the abovementioned cathodoluminescent is unobtainable in any other known cathode ray tube.

Additionally, the unique and advantageous process for fabricating a cathodoluminescent screen includes the formation of a pliable self-supporting film from a viscous suspension by a casting process. In this manner, both fine and coarse grained phosphor particles are uniformly dispersed in the film and uniformly distributed and packed in the resultant screen. The process eliminates dependence upon gravitational settling processes and insures a screen of uniform density and thickness. The film technique renders efficient and economical fabrication of screens since the film is pliable and self-supporting and can be stored and inventoried prior to application to the cathode ray tube faceplate. The film is readily shaped to a desired configuration and applicable with a minimum of time and expense by an operator of little or at least a minimum of training and instruction.

The film technique permits the application of a metallizing layer to the phosphor particle layer either directly or by way of a lacquer layer which conforms to the contour of or spans the phosphor particles therein. Moreover, the lacquer layer is readily applicable to the film prior to the actual deposition and use of the film in conjunction with the cathode ray tube structure in a manufacturing production line.

While there has been shown and described what is at present considered the preferred embodiments of the invention, it will be obvious to those skilled in the art that various changes and modifications may be made therein without departing from the invention as defined in the appended claims.

What is claimed is:

1. A process for fabricating a cathodoluminescent screen for the faceplate of a cathode ray tube comprising the steps of:
   first a viscous suspension to provide a pliable self-supporting film, said film having at least one smooth surface and including phosphor particles homogeneously dispersed in an organic binder;
   second, thoroughly and uniformly wetting said film with an organic adhesive solution;
   third, contacting the smooth surface of said film and inner surface of said cathode ray tube faceplate to cause adherence therebetween; and
   fourth, heating said film and faceplate to volatilize the organic materials from said film and affix said phosphor particles to said inner surface of said cathode ray tube faceplate.

2. The process of claim 1 wherein said phosphor particles are of a size in the range of about 0.5 to 40 microns.

3. The process of claim 1 wherein said casting step is repeated to provide a laminated film stack, said film stack is wetted with an organic adhesive solution, said smooth surface thereof contacted with the inner surface of the cathode ray tube faceplate, and said stack heated to volatilize the organic materials and affix the stack to the faceplate.

4. The process of claim 1 wherein said casting step includes the simultaneous casting of a plurality of viscous suspensions to provide a pliable self-supporting film having a smooth surface and a plurality of contiguous strips of phosphor particles homogeneously dispersed in an organic binder with each of the strips including a phosphor different from the phosphor in the strips immediately adjacent thereto.

5. The process of claim 4 wherein each of said film strips includes one phosphor representative of one of the colors red, green and blue to provide a repetitive red, green and blue strip arrangement.

6. The process of claim 5 wherein each of said film strips is of a thickness in the range of about 0.0008 to 0.002 inch.

7. The process of claim 2 including the step of depositing an electron permeable opaque metal layer onto the surface opposite the smooth surface of said film.

8. The process of claim 2 wherein said viscous suspension includes at least two different phosphor components differing in bulk densities.

9. The process of claim 2 including the steps of depositing a lacquer layer onto the surface opposite to the smooth surface of said film and depositing an electron permeable opaque metal layer onto said lacquer layer.

References Cited

UNITED STATES PATENTS

| | | | |
|---|---|---|---|
| 3,389,030 | 6/1968 | Mepham | 156—67 |
| 1,532,782 | 4/1925 | Sheppard et al. | 156—246 |
| 1,532,795 | 4/1925 | Balch | 156—67 |
| 2,729,583 | 1/1956 | Sadowsky | 156—67 |
| 2,734,013 | 2/1956 | Myers | 156—67 |
| 2,742,376 | 4/1956 | Larach | 156—67 |
| 2,950,222 | 8/1960 | Hinson | 156—67 |

DOUGLAS J. DRUMMOND, Primary Examiner

PO-1050
(5/69)

UNITED STATES PATENT OFFICE
CERTIFICATE OF CORRECTION

Patent No. 3,463,686         Dated August 26, 1969

Inventor(s) Anthony V. Gallaro and William R. McKeirnan

It is certified that error appears in the above-identified patent and that said Letters Patent are hereby corrected as shown below:

Column 6, Claim 1, line 10 "first a" should read--first casting a--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents